US006688468B2

(12) United States Patent
Waterman

(10) Patent No.: US 6,688,468 B2
(45) Date of Patent: Feb. 10, 2004

(54) PHARMACEUTICAL KIT FOR OXYGEN-SENSITIVE DRUGS

(75) Inventor: Kenneth C. Waterman, East Lyme, CT (US)

(73) Assignee: Pfizer Inc., New York, NY (US)

( * ) Notice: Subject to any disclaimer, the term of this patent is extended or adjusted under 35 U.S.C. 154(b) by 0 days.

(21) Appl. No.: 10/099,638

(22) Filed: Mar. 15, 2002

(65) Prior Publication Data

US 2003/0042166 A1 Mar. 6, 2003

Related U.S. Application Data

(60) Provisional application No. 60/276,684, filed on Mar. 16, 2001.

(51) Int. Cl.[7] ........................ C09K 15/02; B65D 85/84; B65D 1/09; B65D 81/26

(52) U.S. Cl. ................................ 206/524.4; 206/524.1; 206/524.5; 206/528; 206/540; 424/412; 252/188.28

(58) Field of Search ............ 424/412; 206/524.1–524.6, 206/528, 540; 252/188.28

(56) References Cited

U.S. PATENT DOCUMENTS

| | | | | | |
|---|---|---|---|---|---|
| 4,524,015 | A | * | 6/1985 | Takahashi et al. | 252/188.28 |
| 4,752,002 | A | * | 6/1988 | Takahashi et al. | 206/524.1 |
| 4,856,650 | A | * | 8/1989 | Inoue | 206/524.2 |
| 5,092,914 | A | * | 3/1992 | Cullen et al. | 96/134 |
| 5,267,646 | A | | 12/1993 | Inoue et al. | 206/204 |
| 5,270,337 | A | | 12/1993 | Graf | 514/499 |
| 5,284,871 | A | | 2/1994 | Graf | 514/499 |
| 5,725,795 | A | | 3/1998 | Kashiba | 525/188.28 |
| 5,839,593 | A | | 11/1998 | McKedy | 215/349 |
| 5,881,534 | A | | 3/1999 | Ahlvist et al. | 53/403 |
| 5,885,481 | A | | 3/1999 | Venkateshwaran et al. | 252/188.28 |
| 5,889,093 | A | | 3/1999 | Hatakeyama et al. | 524/80 |
| 5,928,560 | A | * | 7/1999 | DelDuca et al. | 252/188.28 |
| 5,944,709 | A | | 8/1999 | Barney et al. | 604/410 |
| 5,993,688 | A | * | 11/1999 | Blinka et al. | 252/188.28 |
| 6,007,529 | A | | 12/1999 | Gustrafsson et al. | 604/410 |
| 6,066,226 | A | | 5/2000 | Nagata et al. | 156/251 |
| 6,086,786 | A | * | 7/2000 | Blinka et al. | 252/188.28 |
| 6,093,572 | A | | 7/2000 | Stenholm et al. | 436/1 |
| 6,133,361 | A | | 10/2000 | Hatakayama et al. | 524/447 |
| 6,228,284 | B1 | * | 5/2001 | Ebner et al. | 206/524.1 |
| 6,254,946 | B1 | * | 7/2001 | Hirata et al. | 252/188.28 |
| 6,346,200 | B1 | * | 2/2002 | Rooney | 252/188.21 |
| 6,387,461 | B1 | * | 5/2002 | Ebner et al. | 206/524.6 |
| 6,465,065 | B1 | * | 10/2002 | Teumac et al. | 252/188.28 |
| 6,517,728 | B1 | * | 2/2003 | Rooney | 252/188.21 |

FOREIGN PATENT DOCUMENTS

| | | | |
|---|---|---|---|
| EP | 0864630 | 9/1998 | C09K/15/02 |
| EP | 0964046 | 12/1999 | C09K/15/02 |
| WO | WO9737628 | 10/1997 | A61J/1/00 |

OTHER PUBLICATIONS

Kyushu Yakugakkai Kaiho, "L–Cysteine Ophthalimic Solution Stabilized with Oxygen Absorber" 44, 37–41 (1990).

R.L. Dobson, *J. Packaging Technol,*, 1, 127–131 (1987).

W.F. Zito, "Unraveling the Myths and Mysteries of Induction Sealing", J. Packaging Tech (1990).

"Induction Sealing Guidelines", R.M. Cain (Kerr Group Inc.) (1995).

* cited by examiner

*Primary Examiner*—Shep K. Rose
(74) *Attorney, Agent, or Firm*—Peter C. Richardson; Gregg C. Benson; Carmella A. O'Gorman

(57) ABSTRACT

Pharmaceutical kits are provided that reduce or prevent oxidative degradation of oxygen-sensitive pharmaceutically active ingredients in solid unit dosage forms that are supplied in oxygen permeable containers. Stabilization of the active ingredient is accomplished by incorporating an oxygen absorber into a sealed oxygen permeable container.

40 Claims, No Drawings

PHARMACEUTICAL KIT FOR OXYGEN-SENSITIVE DRUGS

This application claims the benefit of U.S. Provisional Patent Application No. 60/276684, filed Mar. 16, 2001, incorporated in its entirety herein by reference.

FIELD OF THE INVENTION

The present invention relates to the reduction or prevention of oxidative degradation of oxygen-sensitive pharmaceutically active compounds packaged in oxygen permeable containers.

BACKGROUND

The use of oxygen absorbers in the food industry for preservation of foods is well known. However, less is known with respect to stabilization against oxidation of pharmaceuticals with oxygen absorbers. For example, Mitsubishi Gas Corporation introduced into Japan iron plus carbonate salt sachets under the trade name Ageless™ for use in stabilizing packaged foods by preventing oxidation. Other iron and metal-based oxygen absorbers combined with various salts and other incremental improvements quickly followed suit. In a metal oxidation reaction, water must also be present. Water provides the activation mechanism used in most applications. Sachets are generally stored dry where they can be handled without consuming oxygen. In the presence of moist foods, the sachets are activated and begin removing oxygen.

More recently, several companies have introduced self-activated oxygen absorbers to provide oxygen absorption with dry food products. These have involved combining moisture-holding additives to the metals (usually iron) in the sachets (See, e.g., Japanese Publications SHO56-50618 and SHO57-31449; and U.S. Pat. No. 5,725,795). European Patent Application Nos. 864630A1 and 964046A1 describe the use of iron iodide and bromide to allow oxygen absorption in a low humidity environment without the need to bring in water; however, commercial application of this technology has not currently been realized.

Plastics containing oxygen absorbers have also become increasingly prevalent in the new packaging arena. The simplest of these is the use of "stealth absorbers" which use the same principles as above, but imbed the metal in an extrudable plastic. These are activated by moisture, generally by either being in direct contact with water or having a permeable co-extruded layer adjacent to the water. Although these systems are relatively easy to make and inexpensive, they suffer from relatively low absorption capacity and high opacity. In 1998, Cryovac and Chevron introduced ultraviolet photoinitiated oxygen absorbing plastics. In these systems, light in combination with a cobalt salt produces a radical site, which has high reactivity with oxygen. Prior to photoinitiation, the system is quite stable in air and can be extruded to provide transparent, "active packaging." The plastics are reported to be capable of absorbing 45–78 $cm^3$ of oxygen per gram of plastic.

In the pharmaceutical industry, there have been some limited reports of using oxygen absorbers to stabilize drugs. For example, in 1984, tablets of an anti-inflammatory drug were stabilized in large glass jars with oxygen absorbing sachets for six months at 50° C. (Japanese Patent No. SHO59-176247). The source of the oxygen being removed was primarily from the headspace and not from ingress. Similarly, Japanese Patent No. SHO96-253638 describes cold remedy powders stabilized in impermeable bottles by either nitrogen purging or with oxygen absorbers in the bottle. In a 1990 publication, L-cysteine in an ophthalmic ointment was stored with an oxygen absorber. (See, i.e., *Kyushu Yakugakkai Kaiho*, "L-Cysteine Ophthalmic Solution Stabilized with Oxygen Absorber," 44, 37–41 (1990).) In 1995, tonic solutions of vitamin C were stabilized using a bottle cap having an oxygen absorber covered with a polyolefin (Japanese Patent No. SHO94-17056). U.S. Pat. No. 5,839,593 describes the incorporation of an oxygen-absorber into the liner of a bottle cap. More recently, U.S. Pat. Nos. 6,093,572; 6,007,529; and 5,881,534; and PCT publication WO 9737628 describe the use of oxygen absorbers with parenterals and their particular benefit for sterilization. Placement of oxygen-absorbing sachets between an intravenous (IV) bag or blood bag and its outer packaging is commonly used in commercial applications. Pre-filled syringes with absorbers between the syringes and outer packaging are also known.

Oxygen induced drug degradation often limits shelf life (expiration date) or may render a drug unmarketable. In fact, drug candidates that are highly oxygen sensitive are often excluded from further development. In a number of cases, oxygen sensitivity occurs only in the presence of certain excipients. Since oxidation is often not accelerated by standard Arrhenius based increased temperature studies (i.e., accelerated aging studies), there are a number of drug candidates where the oxygen sensitivity of the drug is not recognized until drug development has progressed into late stages of development at which time a significant amount of resources has been expended. At the later stages of development, reformulation and addition of standard antioxidants can require considerably more time and money. In addition, more clinical data may be necessary with a new formulation. Therefore, there is a need for a means of reducing or eliminating oxygen based drug instability without requiring a formulation change.

Even in early drug development, there is a need for oxidation prevention with a new drug candidate to provide adequate stability for initial studies without investing a lot of resources prior to proof of concept. Once a candidate has been selected for further development, the oxygen-sensitivity can then be preferably addressed at the earlier stage of development.

In spite of the wide use of oxygen absorbers in the food industry and more limited reports in the pharmaceutical world, there is no definite information or guidance as to the appropriateness of this technology or best practice methods for use with solid dosage form pharmaceuticals. In particular, there is no information with respect to the efficacy of oxygen absorbers in pharmaceutical packaging using a drug that has a high sensitivity to oxygen. Unlike prior reports where solid dosage forms are stored in glass, there is no reported use of oxygen absorbers with highly permeable plastic packaging for pharmaceutical applications. In addition, there is no information describing relatively low moisture conditions to minimize physical problems (e.g., tablet sticking, disintegration, or dissolution) and chemical stability issues (e.g., hydrolysis).

SUMMARY

The present invention provides a pharmaceutical kit comprising a sealed oxygen permeable container (preferably sealed with a heat-induction seal (HIS)) having deposited therein an oxygen-sensitive drug in a solid unit dosage form and at least one oxygen absorber (preferably a self-activated absorber). The oxygen absorber may be provided in a sachet, cartridge, canister (preferably a cartridge) or any other means of containing the absorber such that the absorber is physically separated from the solid dosage forms deposited in the container and has sufficient oxygen permeability to remove at least a portion of the oxygen in the air within the container. The sealed oxygen permeable container may also include a desiccant.

In a preferred embodiment, the oxygen-sensitive drug is in a high-energy drug form (e.g., amorphous form and nanoparticle sized drug form). A preferred example of a high-energy drug form is a dispersion prepared by spray-drying the drug with an enteric polymer

Definitions

As used herein, the term "unit dose" or "unit dosage" refers to physically discrete units that contain a predetermined quantity of active ingredient calculated to produce a desired therapeutic effect. A "solid unit dosage form" refers to a solid form (e.g., powder, softgels, lyophiles, suppositories, capsules or tablets intended either for ingestion, or other methods of entering the body for medical purposes either directly or by constitution with other materials including liquids) containing a unit dose of the active ingredient.

The term "drug" refers to a pharmaceutically active ingredient(s) and any pharmaceutical composition containing the pharmaceutically active ingredient(s). Pharmaceutical compositions include formulations as well as dosage forms or medicaments (e.g., powders, capsules and tablets).

The term "oxygen-sensitive" or "oxygen-sensitivity" refers to the ability of a substance to react with oxygen under normal ambient conditions (about 5° C. to about 40° C.). The reaction may involve the addition of oxygen to the substance, removal of a hydrogen from the substance, or the loss or removal of one or more electrons from a molecular entity, with or without concomitant loss or removal of a proton or protons. It can also involve indirect processes where an oxidizing agent (e.g., peroxide, superoxide) is generated which oxidizes the drug.

DETAILED DESCRIPTION

The present invention provides for the introduction of an oxygen absorber into the packaging construction of an oxygen permeable pharmaceutical container sealed with an air-tight seal, preferably a heat-induction seal (HIS), to eliminate and/or reduce exposure of the drug to oxygen. There are two major sources of oxygen in permeable bottles typically used in the pharmaceutical industry; (1) oxygen in the headspace, and (2) oxygen that permeates through the walls. The amount of oxygen contributed by the two sources will vary with the size and shape of the bottle, and the means by which the top is sealed. The headspace oxygen will also depend on the number of tablets in the bottle. For calculation purposes, a round bottle made of high-density polyethylene (HDPE) with a labeled capacity of 60 $cm^3$ and a wall thickness of 37 mils (0.94 mm) was used as a representative sample. Oxygen permeability values for a variety of pharmaceutically acceptable bottle materials (available from Eastman Kodak) are listed in Table 1 below. Other suitable packaging materials include polyesters (PET, PEN), nylon, poly(vinyl chloride), poly(vinylidine chloride), poly (tetrafluoroethylene), etc., and multilayer structures.

TABLE 1

| Material | Oxygen permeability [cc mil/($m^2$day atm)]* |
|---|---|
| Low-density polyethylene (LDPE) | 9500 |
| High-density polyethylene (HDPE) | 4000 |
| Polypropylene | 3500 |
| Polystyrene | 5000 |
| Polycarbonate | 4500 |

*Measured according to ASTM D1434

If the bottle is 4 cm in diameter and 7.3 cm in height (in reality the bottle will taper to give less surface area than this approximation), then the surface area will be approximately 100 $cm^2$. If one uses HDPE as the bottle material and a maximum driving force for oxygen ingress (i.e., zero oxygen inside, 0.18 atmosphere oxygen outside the bottle), then the amount of oxygen permeating into the bottle over a one year period can be calculated as follows:

$$4000\ \text{cm}^3\text{mil/(m}^2\text{d atm)} \times 0.18\ \text{atm} \times 360\ \text{d} \times 0.01\ \text{m}^2/37\ \text{mil} = 71\ \text{cm}^3\ \text{of}\ O_2\text{/year}$$

If the bottle holds 60 $cm^3$ of air (i.e., 11 $cm^3$ of oxygen) and assuming no volume is occupied by tablets, then 153 $cm^3$ (11 $cm^3$+(2×71 $cm^3$)) of oxygen absorbing capacity will be needed for a two year shelf-life. As can be seen in this calculation, the initial head space oxygen represents a minor component in the two-year oxygen available for reaction in a permeable bottle, yet this is the only component effectively handled in the prior art. This approximation was tested by measuring the residual oxygen absorption capacity of an oxygen absorber packaged in a 60 mL HDPE bottle with HIS closures after three months. The measured and extrapolated results are shown in Table 2. As can be seen, the measured values predict room temperature needs similar to those calculated for permeability. In order to maintain the oxygen level sufficiently low to allow adequate stability, it would be generally desirable to have about 200 $cm^3$ of oxygen absorption capacity; however, in many cases, a reduced capacity may be adequate, especially if the drug shelf-life is significant in the presence of oxygen.

TABLE 2

| Condition | 3-months $O_2$ Consumption | 2-years $O_2$ Consumption |
|---|---|---|
| 50° C./20% RH | 85 $cm^3$ | 680 $cm^3$ |
| 40° C./75% RH | 56 $cm^3$ | 448 $cm^3$ |
| 30° C./60% RH | 34 $cm^3$ | 272 $cm^3$ |
| 25° C. (Calculated) | 24 $cm^3$ | 192 $cm^3$ |
| 20° C. (Calculated) | 14 $cm^3$ | 112 $cm^3$ |

To be effective, the oxygen-absorber is incorporated into the construction such that the air surrounding the oxygen-sensitive drug has sufficient contact with the oxygen-absorber to remove at least a portion of the oxygen from the air to stop or retard the degradation process. In a typical iron-based oxygen absorber system, every gram of iron can react with about 300 $cm^3$ of oxygen (at 1 atm.) or effectively remove oxygen from about 1500 $cm^3$ of air. The reaction is essentially irreversible such that oxygen continues to be removed from an environment down below detectable limits until the iron is consumed.

Unlike the prior art, the present invention provides for the removal of oxygen not only from the entrapped air within the container but also oxygen that enters the bottle via ingress. The amount of oxygen-absorber added will depend upon the volume of air surrounding the drug, the permeability of the container, the oxidation potential of the drug, and the means by which the oxygen-absorber is incorporated into the construction. The oxygen-absorber need not remove 100% of the oxygen from the air; however, the absorber should be capable of maintaining a level of oxygen less than or equal to about 10.0%, preferably less than or equal to about 3.0%, more preferably less than or equal to about 1.0%, most preferably less than or equal to about 0.5% for about 2 years inside the sealed oxygen permeable container. A water-initiated, a self-initiated or an ultraviolet (UV)-activated oxygen absorber can be incorporated into the construction; however, for solid dosage forms, the choice of oxygen-absorber will depend on whether the drug is also moisture sensitive. If the drug is not moisture sensitive, then a self-activating absorber is preferred. If the drug is moisture sensitive, then an UV-activated absorber is preferred. Alternatively, the combination of a self-activated absorber and a desiccant has been found to be effective. In particular, this system can be made more effective by use of a low water permeability container (e.g., sachet, cartridge, canister, or the like) for the self-activated, iron-based absorber with a desiccant either as a separate unit, or preferably as a single construction with the oxygen absorber. In the latter case, the material surrounding the desiccant is preferably moisture permeable either as a result of the materials chosen, or preferably due to holes (pores) that allow air exchange (moisture transport) with the air surrounding the solid dosage form.

The desiccant for use in the practice of the invention can be any available desiccants; however, preferred desiccants include those commonly used in the pharmaceutical industry which have adequate capacity to handle the combination of moisture ingress through the bottle and moisture given off by the self-activating oxygen absorber. Suitable desiccant are discussed in R. L. Dobson, *J. Packaging Technol.,* 1, 127–131 (1987). A preferred desiccant is silica gel. The desiccant can be supplied in the form of a sachet. cartridge or canister. A preferred form for the practice of the current invention is a canister of silica gel, such as that commercially supplied under the trade name, SorBit™ (Süd-Chemie Corporation, Albuquerque, N.Mex.).

Suitable water-initiated, oxygen-absorbers include metal-based absorbers such as particulate-type iron (e.g., hydrogen reduced iron, electrolytically reduced iron, atomized iron, and milled pulverized iron powders), copper powder, and zinc powder. A preferred metal-based absorber is an iron powder. A moisture-holding material may be incorporated with the absorber to provide a self-activated system. Suitable moisture-holding materials include activated carbon, silicas, zeolites, molecular sieves, hydrogels, and diatomaceous earth. The particular moisture-holding materials used will depend upon the humidity level of the environment. For example, in a very low humidity environment, a moisture carrying material such as a hydrogel that partially binds water may be preferred. An accelerator may also be incorporated such as a metallic iodide or bromide as described in U.S. Pat. No. 6,133,361, incorporated herein by reference. Useful commercially available sachets include D Series FreshPax™ (available from Multisorb Technologies Inc., Buffalo, N.Y., USA), Ageless™ and ZPTJ™ sachets (both available from Mitsubishi Gas Corporation, Tokyo, JP), O-Buster™ (available from Hsiao Sung Non-Oxygen Chemical Co., Ltd., Taiwan, R.O.C.), Bioka™ Oxygen Absorber (available from Bioka Ltd., Kantvik, Finland) and the like.

Any pharmaceutical composition that may degrade as a result of exposure to oxygen may be incorporated into the inventive pharmaceutical kit. Examples of oxygen-sensitive materials which are subject to degradation due to oxygen exposure include materials such as amines either as salts or as free bases, sulfides, allylic alcohols, phenols and the like. In addition, some basic pharmaceutically active materials or compounds, especially amines, with pKa values in the range from about 1 to about 10, more particularly in the range from about 5 to about 9, are subject to oxygen degradation and would therefore benefit from the present invention, as well as, some pharmaceutically active materials or compounds having redox potentials less than or equal to about 1300 mV vs. $Ag/Ag^+$, more preferably less than or equal to about 1000 mV vs. $Ag/Ag^+$. Suitable pharmaceutically active compounds include compounds such as atorvastatin (especially when used in an amorphous form), pseudoephedrine, tiagabine, acitretin, rescinnamine, lovastatin, tretinoin, isotretinoin, simvastatin, ivermectin, verapamil, oxybutynin, hydroxyurea, selegiline, esterified estrogens, tranylcypromine, carbamazepine, ticlopidine, methyldopahydro, chlorothiazide, methyldopa, naproxen, acetominophen, erythromycin, bupropion, rifapentine, penicillamine, mexiletine, verapamil, diltiazem, ibuprofen, cyclosporine, saquinavir, morphine, sertraline, cetirizine, N-[[2-methoxy-5-(1-methyl)phenyl]methyl]-2-(diphenylmethyl)-1-azabicyclo[2.2.2]octan-3-amine and the like. The invention is particularly suitable for stabilizing high-energy drug forms to oxidation. Examples of high-energy drug forms include amorphous forms and nanoparticle sized drug forms. A preferred example of a high-energy form of a drug is prepared by spray-drying drug as a dispersion in combination with an enteric polymer as described in EP 1027886A2 and EP 901786A2, incorporated herein by reference. Suitable enteric polymers include those described in Patent application Nos. WO 0147495 A1, EP 1027886 A2, EP 1027885 A2, and U.S. Pub. No. 2002/0009494 A1, incorporated herein by reference.

The present invention can also stabilize excipients in the dosage form to oxidative degradation. For example, degradation that leads to discoloration, harmful reactivity with the active component of the drug or changes in the dosage form performance, such as dissolution or disintegration rates. Nonexclusive examples of excipients commonly used in pharmaceutical formulations that could be stabilized by application of the present invention include poly(ethylene oxides), poly(ethylene glycols) and poly(oxyethylene) alkyl ethers. The present invention provides a reduction in the degree of oxidative degradation or discoloration where such degradation or discoloration can be measured by light absorption or reflection spectroscopy and/or chromatographic analysis, in particular, HPLC analysis. The invention need not totally eliminate such degradation; however, practice of the present invention preferably reduces the degradation by at least about 20%, more preferably by about 50% and most preferably by about 75% when compared to samples stored in the absence of the oxygen absorber.

Once the oxygen permeable container is filled with a pre-determined amount of oxygen-sensitive drug and oxygen absorber, the container is then sealed, preferably with a heat-induction seal. Other useful seals include adhesives such as pressure sensitive adhesives, thermal adhesives, photocured adhesives, and binary mixture adhesives (such as epoxy resins). Adhesion can also be effected by such techniques as ultrasonic welding which do not require adhesives. A packing material (e.g., cotton) may be optionally added to the container prior to sealing to prevent any damage to the contents such as chipping or cracking of the unit dosage forms. Heat induction sealing is commonly used in the pharmaceutical industry to seal plastic bottle tops, both as a means of protecting the dosage form from the environment and as a means of preventing (and making obvious) any tampering. The induction seal and the bottle are preferably matched to achieve an acceptable seal. Procedures for induction sealing are well known to those skilled in the art. For a detailed description see "Induction Sealing Guidelines", R. M. Cain (Kerr Group, Inc.), 1995 and W. F. Zito "Unraveling the Myths and Mysteries of Induction Sealing", *J. Packaging Tech.,* 1990.

For ease of manufacturing (packaging) and to assure there are no incidences of accidental ingestion of absorbers, a cartridge or canister rather than a sachet is preferred with solid dosage forms. Some challenges associated with the use of cartridges include the level of oxygen permeability of the cartridge or canister and the pharmaceutical acceptability of the cartridge plastic. Suitable materials include any materials known in the packaging industry to be moldable or extrudable either alone or in combination with other additives such as other polymers, plasticizers, stabilizers, etc. Additionally, the plastic materials should have sufficient oxygen permeability either directly or by addition of other additives (pore formers, plasticizers, etc.) or by the presence of holes or pores in the construction (see, e.g., U.S. Pat. No. 4,093,105) such that the oxygen in the environment surrounding the dosage forms may come into contact with the oxygen absorber housed inside the cartridge or canister. Preferably, the plastics and additives have GRAS (generally regarded as safe) status. More preferably, the materials have been previously used in pharmaceutical packaging and have a proven record of pharmaceutical acceptability (e.g., minimal leaching of materials from the cartridge or canister to the dosage form) or acceptance by the appropriate governmental agency for use with pharmaceuticals. Examples of such polymers include polyethylenes, cellulosics, ethylene oxides and copolymers of thereof. Suitable plasticizers include those commonly used in the food or pharmaceutical industry, such as triacetin, phthalate esters, PEG, dibutyl sebacate, glycerin, sorbitol, and citrate esters.

Cartridges, canisters, sachets or other containers which provide a means of physically separating the oxygen absorbing materials from direct contact with the dosage form may be used in the present invention. Cartridges are formed as a container with a lid (often one piece of plastic) which is sealed after addition of the powder to the cavity by standard powder fill techniques. The sealing can be effected using heat, ultrasonic welding or by use of an adhesive. Canisters are generally formed by crimping plastic tube ends after powder filling. As with cartridges, the filling is accomplished by common powder fill techniques. The crimping can be accomplished as part of a cutting operation by using heat, ultrasonics or other techniques well known in the field.

To use the oxygen absorbers in pharmaceutical clinical trials, it is desirable to validate the absorption capacity of each absorber thereby assuring the drug stabilization imparted by the absorber will be present in each bottle. Once the absorption capacity of the oxygen absorber is exceeded, oxygen levels can rise quickly and degrade the drug at a different (faster) rate; consequently, accelerated aging studies for setting expiry can be especially problematic. For small-scale operations, the usual way of handling the absorbers is to purchase them as sachets packaged in foil or barrier plastic. Once the container is opened, oxygen absorption capacity is continuously reduced. The loss of capacity over a two-minute period should be minimal; however, in a clinical packaging campaign, the time between the first and last bottle packaged can be greater than the 30 minute limit recommended by the absorber manufacturers. To minimize the variability in oxygen absorption capacity and to allow for absorption capacity validation, Applicants have identified dispensing devices that dispense absorbing sachets, cartridges and canisters one at a time, while the bulk of the absorbers remain protected in an inert (preferably nitrogen or argon) environment.

Another aspect of the present invention is a process for manufacturing a pharmaceutical kit which includes the steps of: (1) providing an oxygen permeable container; (2) filling the container with a pre-determined amount of solid unit dosage forms comprising an oxygen-sensitive drug; (3) dispensing an oxygen absorber sachet, cartridge, canister or other suitable container from a device designed to dispense the exact appropriate number of absorbers while maintaining the bulk in an inert atmosphere; (4) depositing the oxygen absorber in the container; and (5) sealing the container (preferably with a heat-induction seal). The absorbers are preferably added after the unit dosage forms are added to prevent the absorbers from remaining in the air for extended periods of time in the event of a line stoppage.

To illustrate the effectiveness of the incorporation of an oxygen absorber in an oxygen permeable container, a drug was selected having a known oxidative degradation pathway. The oxidative degradation pathway for the compound of Formula (I) is shown in Scheme I below:

Scheme I

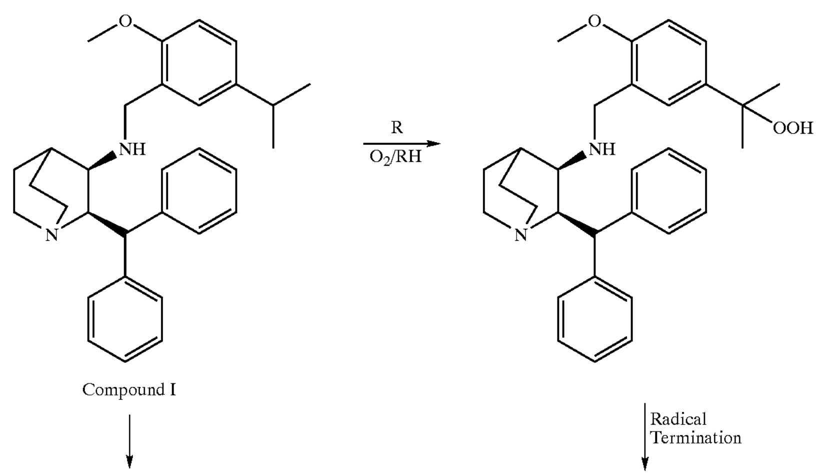

-continued

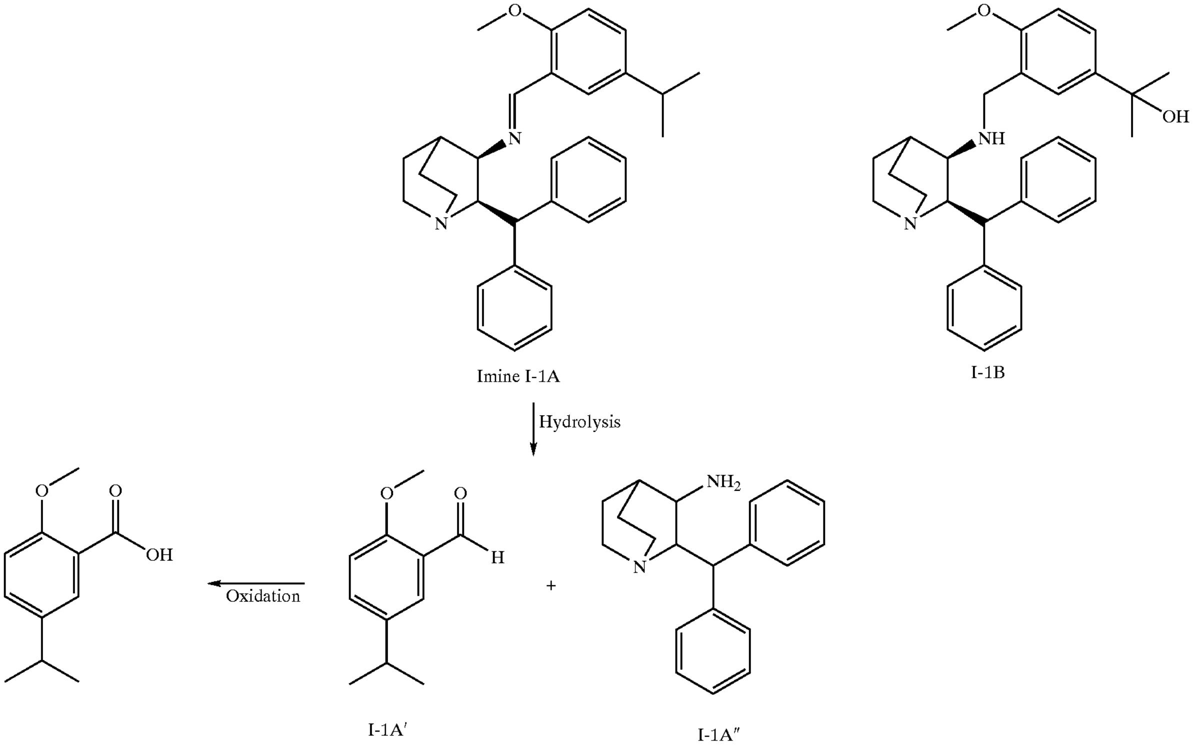

Although the primary oxidative product is the imine I-1A, this material hydrolyzes readily during work-up to give the two products I-1A' and I-1A" as shown. The conditions evaluated and the resulting data are discussed in Example 1 of the Examples below. Although a specific pharmaceutically active compound is used in the Examples, those skilled in the art will appreciate that the particular drug used is not limiting to the scope of the invention and should not be so construed.

EXAMPLES

The following list of materials used in the Examples may be prepared or acquired from the corresponding source.

Compound of Formula (I) below may be prepared by the methods described in U.S. Pat. No. 6,008,357, incorporated herein by reference.

(I)

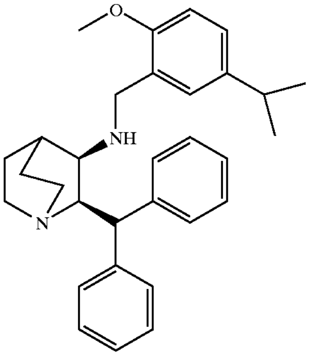

Lactose Fast Flo™ 316 available from Foremost Corp. (Baraboo, Wis.)

microcrystalline cellulose (Avicel™ PH102) available from FMC Pharmaceutical (Philadelphia, Pa.)

sodium crosscarmelose (Ac-Di-Sol™) available from FMC Pharmaceuticals magnesium stearate available from Mallinckrodt (St. Louis, Mo.)

50D FreshPax™ available from Multisorb Technologies, Inc. (Buffalo, N.Y.)

Ageless™ sachets available from Mitsubishi Gas Chemical Company, Inc. (Tokyo, JP)

ZPTJ™ sachets available from Mitsubishi Gas Chemical Company

Sorb-it Can™ available from Sud-Chemie Performance Packaging (Belen, N.Mex.)

Example 1

Tablets containing the compound of Formula (I) as the active ingredient were prepared by first blending the following ingredients except the magnesium stearate in a V-blender for fifteen minutes, then an additional five minutes after the addition of magnesium stearate.

| | |
|---|---|
| Compound of Formula (I) | 41.4% |
| lactose | 25.8% |
| microcrystalline cellulose | 25.8% |
| sodium crosscarmelose | 5.0% |
| magnesium stearate | 2.0% |

The blended material was compressed into tablets with an F-press (available from Vector Corp., Marion, Iowa) equipped with ⅜" SRC tooling. Tablet weights averaged 392 mg with a hardness of 9.5 kP.

In an initial evaluation of oxygen absorbers, the bottles were sealed with heat induction seals (HIS). The following samples were prepared by placing the following materials in a round HDPE bottle (60 cc capacity) and sealing with a heat-induction seal:

Sample 1-1 (Control): 45 placebo tablets plus one tablet containing Compound I (no oxygen absorber or desiccant added);

Sample 1-2: 45 placebo tablets plus one tablet containing Compound I and a desiccant (Sorb-It Can®);

Sample 1-3: 45 placebo tablets plus one tablet containing Compound I and one Ageless™ sachet; and Sample 1-4: 45 placebo tablets plus one tablet containing Compound I and 2 sachets of 50D Fresh Pax™;

Sample 1-5: 45 placebo tablets plus one tablet containing Compound I and four ZPTJ™ sachets.

Tablets were stored eighteen weeks under three different conditions: (1) 5° C./75% relative humidity (RH); (2) 40° C./75% RH; and (3) 50° C./20% RH. Air in the bottles was sampled using a gas tight syringe equipped with a septum seal as the foil was punctured. The sampled air was analyzed using a Mocon™ headspace analyzer (PAL Model 450 available from Mocon™ Inc., Minneapolis, Minn.). Each tablet was dissolved in 250 ml of a solution prepared by dissolving 21.6 g of octane sulfonic acid and 6.8 g of potassium phosphate in 1.0 liters of purified water and adjusting the pH to 3 with phosphoric acid followed by the addition of 818 mL of acetonitrile. Degradation products were identified by high pressure liquid chromatography (HPLC) (Waters sym C8 column, 15 cm×3.9 mm, nylon acrodisc filter, HPLC HP 1100 series, 20 $\mu$l injection volume, flow of 1 mL/min). The degradation products were compared against three known standards (Compounds I-1A', I-1A" and I-1B). The results from the analysis are summarized in Table 2 below.

It should be noted that the percent degradation due to the hydrolysis products of the compound of Formula I-1A (i.e., compounds of Formula I-1A' and I-1A") decreases with the addition of oxygen absorbers and increasing temperature thus leading to an overall decrease in the percent degradants with increased temperature. However, no significant corresponding increase in other HPLC peaks was observed. The results outlined in Table 2 above clearly show a dramatic decrease in the level of degradation for those samples that incorporated oxygen absorbers into the sealed container. Under the conditions tested, the degradation is essentially eliminated thus converting an unacceptable product into an acceptable product having good long-term stability.

What is claimed is:

1. A pharmaceutical kit comprising a sealed oxygen permeable container having deposited therein an oxygen-sensitive drug in a solid unit dosage form and at least one oxygen absorber.

2. The pharmaceutical kit of claim 1 wherein said at least one oxygen absorber is self-activating.

3. The pharmaceutical kit of claim 1 wherein said at least one oxygen absorber is provided in a sachet, cartridge or canister.

4. The pharmaceutical kit of claim 1 wherein said oxygen absorber is provided in a cartridge.

5. The pharmaceutical kit of claim 1 wherein said oxygen permeable container is selected from the group consisting of low density polyethylene, high density polyethylene, polypropylene, polystyrene and polycarbonate containers.

6. The pharmaceutical kit of claim 1 wherein said oxygen permeable container is high-density polyethylene.

TABLE 2

18-Week Stability of Compound I Packaged in 60 cc-HDPE Bottles with HIS.

| Sample No. | Condition | No. weeks | I-1A" Wt % | I-1B Wt % | I-1A' Wt % | Unknown Area % | Unknown Area % | Total % | $[O_2]$ Mole % |
|---|---|---|---|---|---|---|---|---|---|
| | Initial bulk | 0 | 0.300 | 0.027 | 0.000 | 0.01 | 0.03 | 0.37 | |
| 1-1 | 5° C./ | 7 | 0.336 | 0.029 | 0.006 | 0.01 | 0.03 | 0.41 | 20.7 |
| Control | 75% RH | 18 | 0.305 | 0.028 | 0.000 | 0.02 | 0.02 | 0.37 | 21.0 |
| | 40° C./ | 7 | 0.703 | 0.166 | 0.134 | 0.09 | 0.52 | 1.61 | 19.9 |
| | 75% RH | 18 | 0.546 | 0.266 | 0.107 | 0.08 | 0.66 | 1.66 | 19.9 |
| | 50° C./ | 7 | 0.488 | 0.252 | 0.084 | 0.08 | 0.84 | 1.74 | 19.9 |
| | 20% RH | 18 | 0.393 | 0.288 | 0.079 | 0.09 | 1.14 | 1.99 | 19.0 |
| 1-2 | 5° C./ | 7 | 0.328 | 0.029 | 0.000 | 0.00 | 0.03 | 0.39 | 20.8 |
| | 75% RH | 18 | 0.297 | 0.030 | 0.000 | 0.01 | 0.02 | 0.36 | 21.1 |
| | 40° C./ | 7 | 0.812 | 0.117 | 0.155 | 0.09 | 0.13 | 1.30 | 20.0 |
| | 75% RH | 18 | 1.291 | 0.280 | 0.297 | 0.09 | 0.32 | 2.28 | 19.9 |
| | 50° C./ | 7 | 1.045 | 0.244 | 0.277 | 0.06 | 0.32 | 1.95 | 19.8 |
| | 20% RH | 18 | 0.910 | 0.377 | 0.175 | 0.08 | 0.49 | 2.03 | 20.3 |
| 1-3 | 5° C./ | 7 | 0.329 | 0.032 | 0.011 | 0.01 | 0.03 | 0.41 | 1.1 |
| | 75% RH | 18 | 0.303 | 0.030 | 0.002 | 0.01 | 0.02 | 0.37 | 1.3* |
| | 40° C./ | 7 | 0.246 | 0.046 | 0.000 | 0.01 | 0.02 | 0.32 | 0.0 |
| | 75% RH | 18 | 0.139 | 0.049 | 0.002 | 0.02 | 0.02 | 0.23 | 1.2* |
| | 50° C./ | 7 | 0.141 | 0.047 | 0.000 | 0.00 | 0.03 | 0.22 | 0.6 |
| | 20% RH | 18 | 0.105 | 0.060 | 0.003 | 0.02 | 0.01 | 0.20 | 0.3 |
| 1-4 | 5° C./ | 7 | 0.330 | 0.032 | 0.006 | 0.01 | 0.03 | 0.41 | 2.2 |
| | 75% RH | 18 | 0.310 | 0.034 | 0.005 | 0.01 | 0.02 | 0.38 | 1.4* |
| | 40° C./ | 7 | 0.250 | 0.047 | 0.004 | 0.01 | 0.02 | 0.33 | 0.0 |
| | 75% RH | 18 | 0.191 | 0.049 | 0.003 | 0.02 | 0.01 | 0.27 | 1.8* |
| | 50° C./ | 7 | 0.159 | 0.058 | 0.003 | 0.01 | 0.01 | 0.24 | 0.1 |
| | 20% RH | 18 | 0.098 | 0.056 | 0.004 | 0.01 | 0.01 | 0.18 | 0.0 |
| 1-5 | 5° C./ | 7 | 0.340 | 0.031 | 0.004 | 0.01 | 0.03 | 0.42 | 0.7 |
| | 75% RH | 18 | 0.314 | 0.029 | 0.002 | 0.01 | 0.02 | 0.38 | 2.1* |
| | 40° C./ | 7 | 0.172 | 0.048 | 0.003 | 0.02 | 0.04 | 0.28 | 0.0 |
| | 75% RH | 18 | 0.125 | 0.055 | 0.003 | 0.02 | 0.03 | 0.23 | 2.5* |
| | 50° C./ | 7 | 0.121 | 0.068 | 0.000 | 0.02 | 0.05 | 0.22 | 0.0 |
| | 20% RH | 18 | 0.099 | 0.109 | 0.004 | 0.03 | 0.05 | 0.29 | 0.0 |

*These sample points were measured after a second puncture of the bottle due to a faulty syringe. The results for these points represent maximum oxygen levels in those samples.

7. The pharmaceutical kit of claim 1, 2, 3, 4, 5, or 6 wherein said sealed oxygen permeable container is sealed with a heat-induction seal.

8. The pharmaceutical kit of claim 1 wherein said oxygen-sensitive drug contains an oxygen sensitive excipient.

9. The pharmaceutical kit of claim 1 wherein said oxygen-sensitive drug contains an oxygen-sensitive pharmaceutically active compound.

10. The pharmaceutical kit of claim 9 wherein said oxygen-sensitive pharmaceutically active compound is an amine having a pKa value from about 1 to about 10.

11. The pharmaceutical kit of claim 9 wherein said oxygen-sensitive pharmaceutically active compound is an amine having a pKa value from about 5 to about 9.

12. The pharmaceutical kit of claim 9 wherein said oxygen-sensitive pharmaceutically active compound has a redox potential less than or equal to about 1300 mV.

13. The pharmaceutical kit of claim 12 wherein said redox potential is less than or equal to about 1000 mV.

14. The pharmaceutical kit of claim 1 wherein said oxygen-sensitive drug is in a high-energy form.

15. The pharmaceutical kit of claim 14 wherein said high-energy form of said oxygen-sensitive drug is a dispersion of said drug prepared by spray-drying said drug with an enteric polymer.

16. The pharmaceutical kit of claim 1 wherein said oxygen absorber is capable of maintaining a level of oxygen less than or equal to about 10.0% for about 2 years inside said sealed oxygen permeable container.

17. The pharmaceutical kit of claim 1 wherein said oxygen absorber is capable of maintaining a level of oxygen less than or equal to about 3.0% for about 2 years inside said sealed oxygen permeable container.

18. The pharmaceutical kit of claim 1 wherein said oxygen absorber is capable of maintaining a level of oxygen less than equal to about 1.0% for about 2 years inside said sealed oxygen permeable container.

19. The pharmaceutical kit of claim 1 wherein said oxygen absorber is capable of maintaining a level of oxygen less than or equal to about 0.5% for about 2 years inside said sealed oxygen permeable container.

20. The pharmaceutical kit of claim 1 wherein the level of degradation or discoloration of said oxygen-sensitive drug is reduced by about 20%.

21. The pharmaceutical kit of claim 1 wherein the level of degradation or discoloration of said oxygen-sensitive drug is reduced by about 50%.

22. The pharmaceutical kit of claim 1 wherein the level of degradation or discoloration of said oxygen-sensitive drug is reduced by about 75%.

23. The pharmaceutical kit of claim 1 wherein said sealed oxygen permeable container further comprises a desiccant.

24. A pharmaceutical kit comprising a high density polyethylene container sealed with a heat induction seal having deposited therein an oxygen-sensitive drug in a solid unit dosage form and at least one self-activating oxygen absorber provided in a cartridge.

25. The pharmaceutical kit of claim 24 wherein said oxygen-sensitive drug contains an oxygen sensitive excipient.

26. The pharmaceutical kit of claim 24 wherein said oxygen-sensitive drug contains an oxygen-sensitive pharmaceutically active compound.

27. The pharmaceutical kit of claim 26 wherein said oxygen-sensitive pharmaceutically active compound is an amine having a pKa value from about 1 to about 10.

28. The pharmaceutical kit of claim 26 wherein said oxygen-sensitive pharmaceutically active compound is an amine having a pKa value from about 5 to about 9.

29. The pharmaceutical kit of claim 26 wherein said oxygen-sensitive pharmaceutically active compound has a redox potential less than or equal to about 1300 mV.

30. The pharmaceutical kit of claim 29 wherein said redox potential is less than or equal to about 1000 mV.

31. The pharmaceutical kit of claim 24 wherein said oxygen-sensitive drug is in a high-energy form.

32. The pharmaceutical kit of claim 25 wherein said high-energy form of said oxygen-sensitive drug is a dispersion of said drug prepared by spray-drying said drug with an enteric polymer.

33. The pharmaceutical kit of claim 24 wherein said self-activating oxygen absorber is capable of maintaining a level of oxygen less than or equal to about 10.0% for about 2 years inside said high density polyethylene container.

34. The pharmaceutical kit of claim 24 wherein said self-activating oxygen absorber is capable of maintaining a level of oxygen less than or equal to about 3.0% for about 2 years inside said high density polyethylene container.

35. The pharmaceutical kit of claim 24 wherein said self-activating oxygen absorber is capable of maintaining a level of oxygen less than equal to about 1.0% for about 2 years inside said high density polyethylene container.

36. The pharmaceutical kit of claim 24 wherein said self-activating oxygen absorber is capable of maintaining a level of oxygen less than or equal to about 0.5% for about 2 years inside said high density polyethylene container.

37. The pharmaceutical kit of claim 24 wherein the level of degradation or discoloration of said oxygen-sensitive drug is reduced by about 20%.

38. The pharmaceutical kit of claim 24 wherein the level of degradation or discoloration of said oxygen-sensitive drug is reduced by about 50%.

39. The pharmaceutical kit of claim 24 wherein the level of degradation or discoloration of said oxygen-sensitive drug is reduced by about 75%.

40. The pharmaceutical kit of claim 24 wherein said high density polyethylene container further comprises a desiccant.

* * * * *